United States Patent [19]

Mauchan

[11] Patent Number: 5,262,808
[45] Date of Patent: Nov. 16, 1993

[54] CAMERA, ACCESSORIES AND METHOD OF TAKING PHOTOGRAPHS

[75] Inventor: Donald E. Mauchan, Marlboro, Mass.
[73] Assignee: Polaroid Corporation
[21] Appl. No.: 803,101
[22] Filed: Dec. 5, 1991
[51] Int. Cl.⁵ .............................................. G03B 17/24
[52] U.S. Cl. .................................... 354/108; 354/277; 354/296
[58] Field of Search ............................ 354/105–109, 354/295, 296, 126, 145.1, 149.11

[56] References Cited

U.S. PATENT DOCUMENTS 4,717,930 10/1988 Wheeler ............................... 354/108
4,894,671 1/1990 Wheeler ............................... 354/108

Primary Examiner—Michael L. Gellner
Assistant Examiner—Howard Blankenship
Attorney, Agent, or Firm—John J. Kelleher

[57] ABSTRACT

An image bearing template is inserted into a film assemblage incorporating a cassette with instant-type film units therein. The cassette is inserted into a camera to produce film units having the indicia of the template thereon. Said camera includes a flash unit and a lens opening and interposed between the camera housing and the object to be photographed is a shield. The shield is generally opaque having a white reflective surface thereon which reflects part of the light from the flash unit back toward the lens of the camera. Some of the light from the flash unit passes through an aperture in the shield to be reflected from the object to be photographed and light reflected therefrom passes through a second aperture in the shield and directly to the lens in the front wall of the camera.

17 Claims, 4 Drawing Sheets

5,262,808

CAMERA, ACCESSORIES AND METHOD OF TAKING PHOTOGRAPHS

FIELD OF THE INVENTION

This invention relates to a camera having accessory attachments to both the exterior of the camera housing and the film cassette inside the camera housing.

BACKGROUND OF THE INVENTION

A 1988 patent to Wheeler, U.S. Pat. No. 4,717,930, discloses a camera using instant photography techniques which incorporates a transparent template mounted in alignment with the exposure opening of a film cassette inserted into the camera. The template includes indicia which is recorded on each successive film unit as the normal exposure cycle occurs.

Additionally, the Wheeler patent discloses a solid transparent body secured to the front of the camera housing and overlying the camera's strobe or flash unit, view finder, and lens opening. The body is of clear transparent plastic material such as LUCITE. An oval aperture in the body is aligned with the lens opening of the camera whereby light generated by the flash unit and reflected from the object being photographed passes directly through the aperture to the lens opening. The patent discloses that the aperture is preferably elliptical in shape.

On the other hand, some of the light from the flash unit is reflected one or more times by the surfaces of the plastic body until it arrives at the elliptical surface of the aperture through the body. The elliptical surface allows some of the light to pass as diffused light through the aperture and into the lens opening in the camera. This diffused light results in a lightening or washing out of the area of the film unit surrounding the photographed object, tending to make the background in the film unit generally white except for the shape of the aperture through the plastic body and the indicia on the template.

The disclosed template in the film cassette and the diffused light combine to expose the periphery of the film unit in the cassette and produce an image of the indicia of the template on a white background which surrounds the elliptical shape encompassing the object being photographed.

The light modulated, white or near white, background produced by the reflected diffused light from the plastic body emphasizes the indicia from the template and the object being photographed.

Unfortunately, as disclosed in the Wheeler patent, the plastic body to be affixed to the front face of the camera housing is heavy and the attaching mechanism results in a heavy, unbalanced camera.

Placing templates in alignment with the exposure opening of the film cassettes for purposes of having a particular indicia on each successive film frame is known. Examples are disclosed in commonly owned, copending, patent application Ser. No. 620,897, filed Dec. 3, 1990 now U.S. Pat. No. 5,144,348.

SUMMARY OF THE INVENTION

A camera of the instant photography-type is provided in this invention, including a housing with a strobe or flash unit, an eye piece for the camera's viewfinder and a lens-shutter mechanism for exposing film units placed inside the camera.

A film cassette to be placed inside the camera includes a plurality of film units within the cassette and a frame or exposure window in its forward wall which is initially screened from light by a dark slide. A template of transparent plastic material, such as MYLAR, is inserted into the cassette between the dark slide and the forward wall and it serves to produce preferred indicia on exposed film frames when the film units are exposed to light after the dark slide has been ejected.

A paper or plastic reflecting shield which is largely opaque is adapted to be mounted on the front face of the camera by the photographer. It is formed from a flat, generally rectangular shape sheet. It may be supplied to users as a unit with the template or in combination with the template and a film cassette. The generally rectangular shield includes a plurality of score lines. Two parallel score lines extend from the top to the bottom of the shield to allow the side edges of the shield to be folded along the score lines to form the shield into a generally U-shaped configuration. The folded shield fits over the front face of the camera. Pressure sensitive adhesive is applied along the inside surface of the folded sides in the form of double-sided adhesive tape. This allows attachment of the shield to the sides of the camera housing with the inside face of the U-shaped shield being separated by an inch or so from the strobe lens opening, and view finder opening.

Additional score lines are provided in the main body of the shield of particular geometric shape and size as desired and at such time as the shield is about to be mounted on a camera, the geometric shapes may be manually punched from the shield to provide apertures to be aligned with the strobe, lens opening, and view finder opening. Preferably the aperture aligned with the strobe is of smaller cross-sectional area than the strobe itself to increase strobe light reflection from the inside surface of the shield. Preferably the inside surface of the shield is white to increase reflectivity. The front face of the camera housing is normally black but could be of a light color, such as white, to increase reflectivity.

The shield may be in the form of a greeting card, in which case the indicia on the template would be compatible with that of the greeting card. For example, if the indicia on the template is "Merry Christmas", then the card may show a winter wonderland scene.

Objects of the invention not understood from the above will be appreciated fully upon a review of the drawings and the description of the preferred embodiments which follow.

DESCRIPTION OF THE PREFERRED EMBODIMENTS

Figure 1:
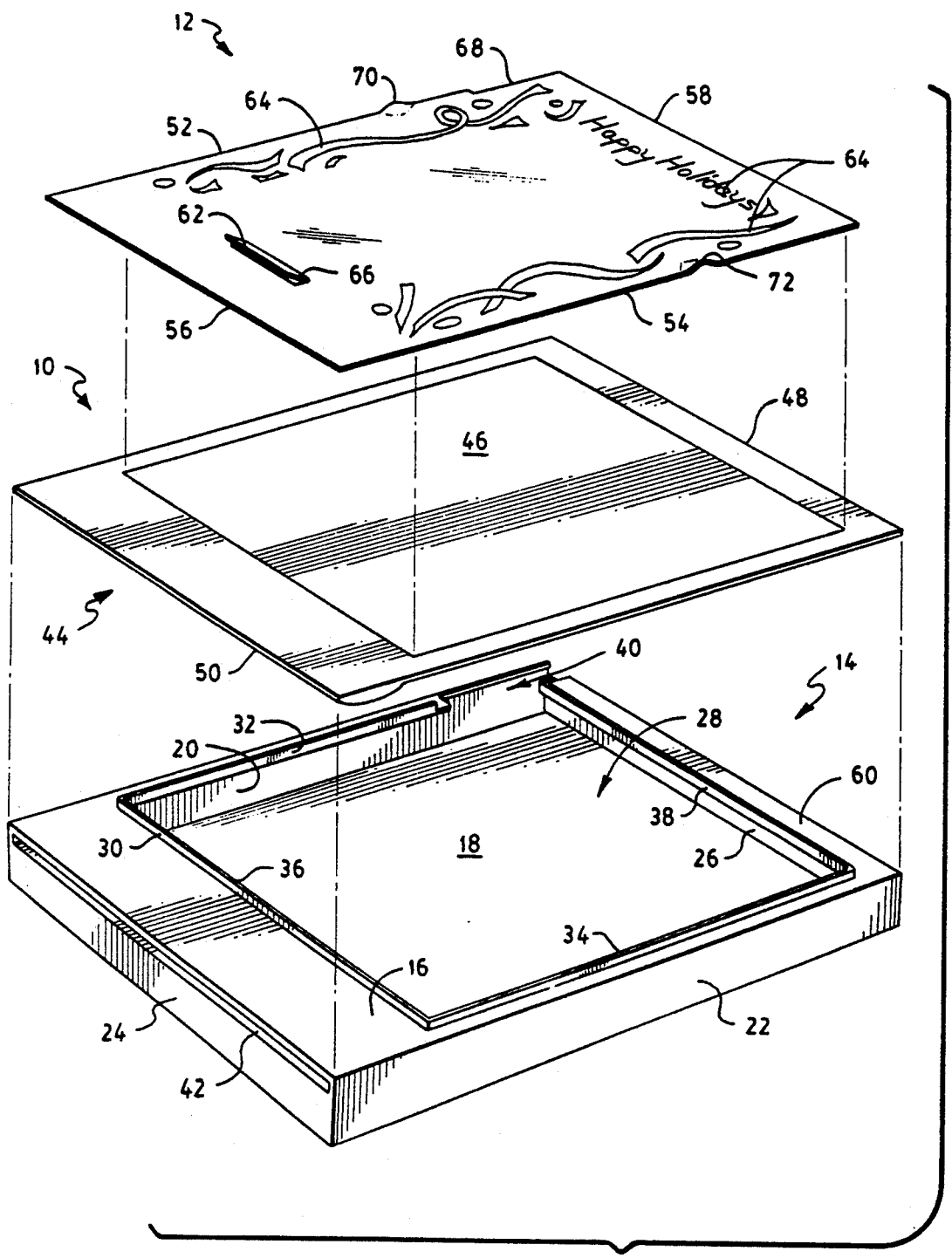
FIG. 1 is an exploded perspective view of a photographic film assemblage and a preferred embodiment of an image bearing template which is adapted for use therewith.

Reference is now made to FIG. 1 of the drawings wherein is shown a photographic film assemblage 10 and a preferred embodiment of an image bearing template 12 which is specifically designed for use therewith. The film assemblage 10 includes a cassette 14 having spaced forward and bottom walls 16 and 18, a pair of laterally spaced side walls 20 and 22, and longitudinally spaced leading and trailing end walls 24 and 26, respectively. The forward wall 16 includes therein an exposure aperture or window 28 defined by an upstanding integral rib 30. The rib 30 includes parallel, laterally spaced, longitudinally extending edges 32 and 34, with the edge 32 being shorter in length than the edge 34, and parallel, longitudinally spaced, laterally extending edges 36 and 38. The forward wall 16 also includes an elongate opening 40 which also extends part way down the trailing end wall 26. The leading end wall 24 cooperates with an edge of the forward wall 16 to define a film exit opening 42.

Supported within the cassette 14 is a stack of individual film units 44 (only one being shown), of the instant or self-developing type and a spring platen (not shown) for supporting and urging the stack toward the forward wall 16 such that the uppermost film unit 44 in the stack is located in engagement with the interior surface of the forward wall 16. Thus positioned, the photosensitive area 46 of the film unit 44 is located in alignment with the exposure window 28. A dark slide (not shown) is initially located between the uppermost film unit 44 and the interior surface of the forward wall 16 to prevent premature exposure of the film unit 44 during the loading of the film assemblage 10 into a camera. Subsequent to such loading, a camera mounted film advancing means is actuated such that it enters the cassette 14 via the opening 40, engages a trailing edge of the dark slide and moves its leading end out of the cassette 14 via the opening 42 and into the bite of a pair of rollers which complete the removal of the dark slide. With the dark slide removed, the uppermost film unit 44 is urged upwardly by the spring platen into engagement with the forward wall 16 for its exposure. Subsequent to its exposure, the aforementioned film advancing means is again actuated so as to move it into engagement with a trailing edge 48 of the film unit 44 and move the latter partially out of the cassette 14 via the opening 42 and into the bite of the aforementioned rollers. As is well known in the art, the rollers continue the advancement of the exposed film unit 44 from the cassette 14 while simultaneously rupturing a container 50 of processing liquid and spreading its contents between predetermined layers of the film unit 44 so as to initiate the formation of a visible image therein.

In accordance with the instant invention, the image produced within the film unit 44 may be enhanced by placing the image bearing template 12 between the image bearing light entering the camera via its objective lens and shutter and the film unit being exposed. At this point it should be noted that although the template shown in the drawings produce an image having a finite definition, the term "image bearing template" also includes a template which will produce an image having a nonfinite definition. An example of a finite definition would be that formed by the indicia "HAPPY HOLIDAYS" on the template 12. An example of an image of nonfinite definition would be one where the image being superposed on the film unit by the template would appear to fade away or dissolve as it "moves" toward the subject being photographed, much like a vignette having undefined borders.

The image bearing template 12 may be a thin (0.005") generally planar, rectangular, resilient sheet of transparent material, e.g., MYLAR. The template 12 includes laterally spaced, parallel, longitudinally extending side edges 52 and 54, and longitudinally spaced, laterally extending leading and trailing edges 56 and 58, respectively. The lateral distance between the side edges 52 and 54 is substantially the same as, or slightly less than, the corresponding lateral distance between the edges 32 and 34 of the exposure window defining rib 30. The longitudinal distance between the leading and trailing edges 56 and 58 is greater than the corresponding distance between the edges 36 and 38 of the rib 30 but less than the corresponding distance between the cassette's leading and trailing end walls 24 and 26, respectively. The template 12 may be manually inserted into its operative position between the dark slide (not shown) and the interior surface of the forward wall 16 of the cassette by sliding the trailing edge 58 under a trailing end portion 60 of the cassette's forward wall 16 and then flexing the template 12 so as to enable its leading edge 56 to be inserted under the edge 36 of the rib 30. Thus located, the user may now allow the template 12 to resume its unflexed condition thus permitting the leading end of the template to slide to a position under the forward wall 16 and on top of the aforementioned dark slide. Alternatively the template 12 may be a part of the film assemblage 10 when it is originally assembled at the factory. When the template 12 is located in its operative position, a stop 62 is located substantially adjacent to the edge 36 such that engagement between the two will not only prevent the removal of the template 12 from the cassette 14 in response to the friction applied thereto during the removal of the dark slide, but it also, in combination with the adjacency of the trailing edge 58 with the trailing end wall 26, prevents an indicia or image bearing portion 64 of the template from becoming longitudinally displaced relative to the photosensitive area 46 of the uppermost film unit 44. The stop 62 may be formed by stamping out a generally U-shaped section and folding it about an integral laterally extending hinge 66. The longitudinal distance between the stop 62 and the edge 58 of the template is substantially equal to, or slightly less than, the corresponding distance between the edge 36 and the interior surface of the trailing end wall 26 of the cassette 14. It should be noted that the template 12 may be cut away at 68 such that the aforementioned film advancing means may be provided with additional clearance as it extends into the cassette 14, via the opening 40, and engages either the trailing end of the dark slide, or the uppermost film unit 44 if the dark slide has been previously removed, without being able to engage the template 12.

Lateral movement of the template 12 relative to the exposure window 28 is prevented by a pair of upwardly projecting dimples 70 and 72 integrally formed in the edges 52 and 54, respectively. These dimples are adapted to engage the adjacent edges 32 and 34 of the rib 30 to prevent said lateral displacement of the template 12 relative to the exposure window 28.

The aforementioned indicia 64 may be printed on either side of the template. However, it is preferred to print the indicia on the side of the template 12 facing away from the film unit in order to prevent scratching of the indicia and possible removal of a portion thereof during removal of an underlying dark slide or film unit. Such indicia may be originally protected by a peelable transparent cover sheet which would be releasably secured to the face of the template containing the indicia and which would be manually removed therefrom prior to inserting the template into the cassette.

In practice the particular indicia on the template may be printed on one side of a shield 94 which may take the form of a greeting card forming one element of a product package. The package may include the template 12, the greeting card 94 and a package of instant film 95 or the template and greeting card may be packaged separately as a unit for use with a separately purchased film package. It is contemplated that the greeting card surface displaying the template indicia will serve as a visual display for customers who desire a particular indicia for special occasion photographs. A rear surface of the greeting card also serves as one surface of a U-shaped light reflecting shield to be attached to the front face of a camera in a manner to be discussed subsequently.

Looking now to FIGS. 2-5, an instant camera 74, according to the present invention, includes a housing 76 having a rear wall 78, a front wall 80 having a film exit slot therein, and side walls 82 and 84. An eye piece 86 projects rearwardly from the housing and serves to allow the photographer to view the object to be photographed. A pivotable housing 88 for a strobe or flash unit 90 is shown in its operative position ready for actuation by a shutter release button 92. The camera 74 is a Model 600 LMS camera sold by Polaroid Corporation.

A generally U-shaped light reflecting shield 94 is attached to the front face of the camera 74 by pressure sensitive adhesive tape secured to the inside surface of two side flaps 96, 98 of the shield. The pressure sensitive adhesive is preferably in the form of double sided adhesive tape 100, best seen in FIG. 5. Conventional peel strips (not shown) cover the adhesive before it is exposed for attachment to the camera side walls 82, 84.

Figure 3:
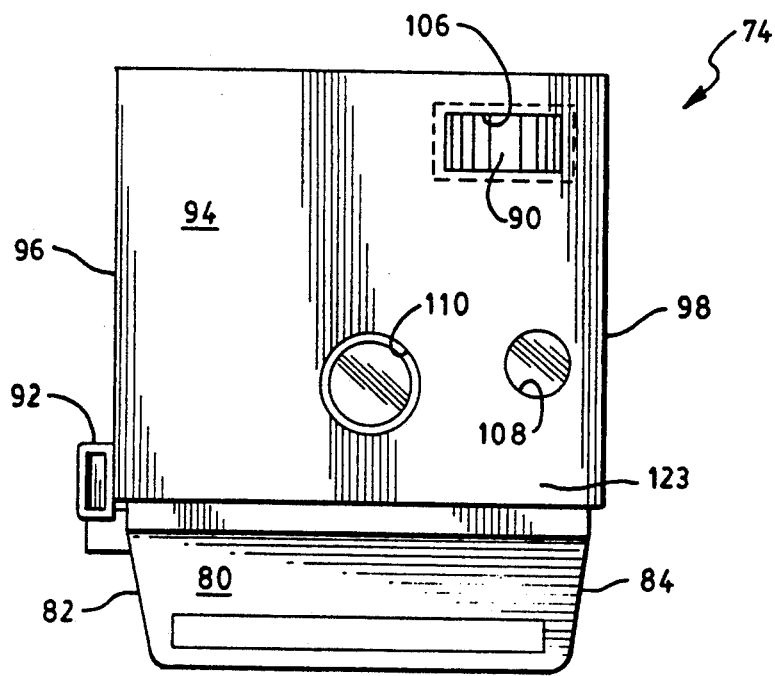
FIG. 3 is a front elevational view of the camera and shield combination of FIG. 2.

Observing particularly FIG. 3, the shield 94 includes three apertures 106, 108, 110; one each for the flash unit 90, the camera's view finder, and the camera's objective lens. Note that the aperture 106 for the flash unit 90 is smaller in size than the cross-sectional area of the flash unit 90. Aperture 108 for the view finder is illustrated as being larger than the view finder itself but it could be smaller. Aperture 110 is shown to be about the same size as the lens opening 111 (see FIG. 4). It will be observed that the strobe or flash unit 90, its associated aperture 106, the lens opening 111, and its associated aperture 110 all must be aligned correctly for successful operation such that a major portion of the light from the flash unit 90 may pass in a straight line through aperture 106 to the object 112 to be photographed and reflected light from the object 112 in a straight line through the aperture 110 and the lens opening 111.

Figure 4:
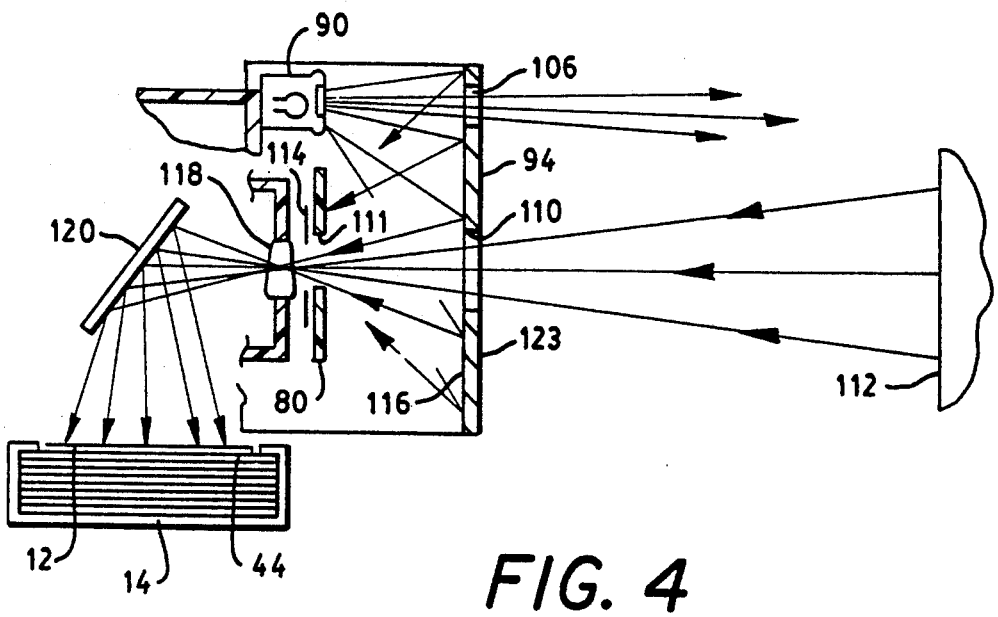
FIG. 4 is a schematic fragmentary sectional view of the camera of FIG. 2.

Looking to FIG. 4, light reflected from the object 112 passes as image bearing light through the aperture 110, the lens opening 111 and through the lens and shutter assembly 114 at such time as the shutter and flash unit are actuated. The remainder of the light from flash unit 90 is reflected from the inside surface 116 of the shield and after a series of reflections, passes through the lens and shutter 114 as non image bearing diffused light and is reflected by a mirror 120 and ultimately, along with the image bearing light, passes through the template 12 and onto a film unit 44.

Figure 5:
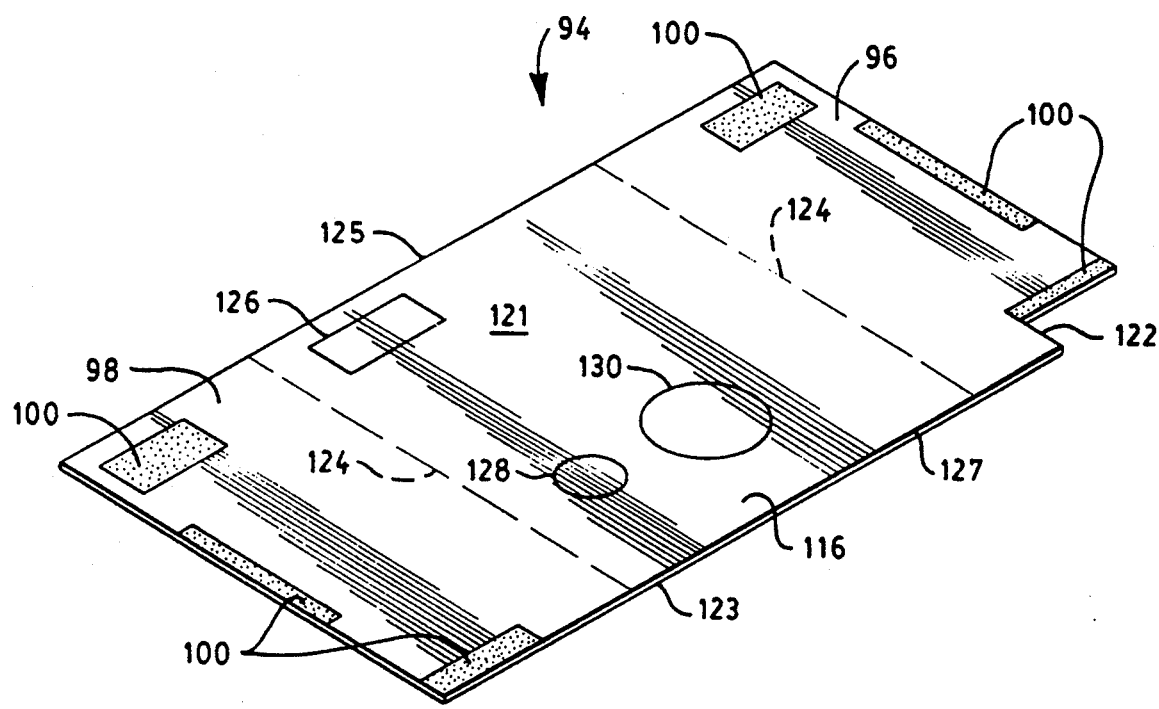
FIG. 5 is a perspective view of the flat preform comprising the light reflecting shield of this invention before it is folded into an operative configuration.
Figure 6:
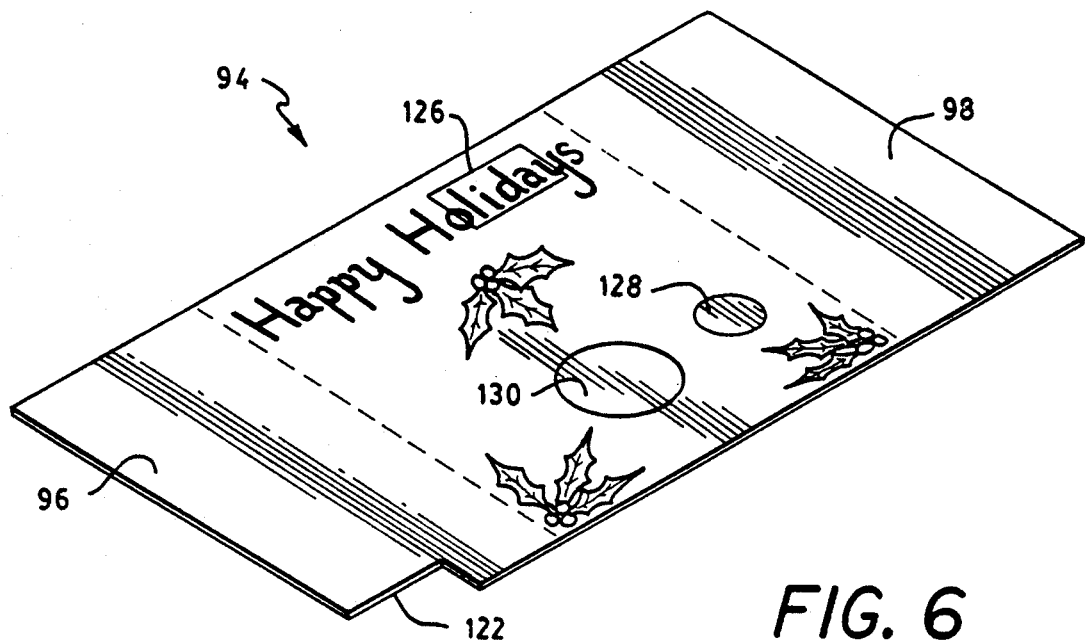
FIG. 6 is a perspective view of the front surface of the shield which is in the form of a greeting card.
Figure 7:
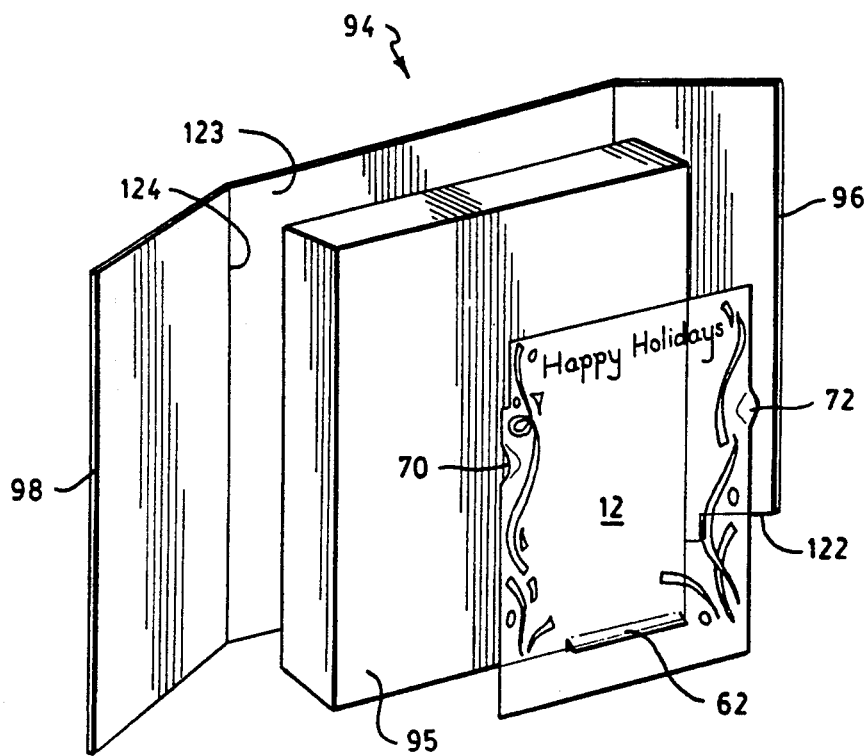
FIG. 7 is an exploded perspective view of a kit which is adapted to be sold as a unit and which includes the shield, a package of instant film, and a template.

Looking to FIG. 5, the shield 94 is initially formed as a flat piece of opaque plastic or paper having a central portion 121 bounded by the two side flaps 96, 98 and with a cut-out 122 at one corner to accommodate the shutter release button 92. The decorative indicia displayed on the greeting card-reflecting shield surface 123 which faces toward photograph object 112 is in harmony with, if not identical to, that on the template 12. The reflecting surface 116, which preferably is white, is on the opposite surface of the greeting card (facing upward as illustrated in FIG. 5). A pair of parallel score lines 124 extend from the top 125 to the bottom 127 of the shield to allow easy pattern bending of the side flaps 96, 98 when they are ready to be attached to side walls 82, 84 of the camera housing. Other score lines 126, 128, 130 are particularly designed of a geometric pattern to weaken the shield wall and allow the geometric patterns to be punched from the shield at such time as the operator is ready to assemble the shield on the face of the camera. The inside surface of one of the side flaps 96, 98 may contain printed instructions for transforming the greeting card 94 into a reflecting shield and attaching it to a camera of the type shown at 74.

Figure 2:
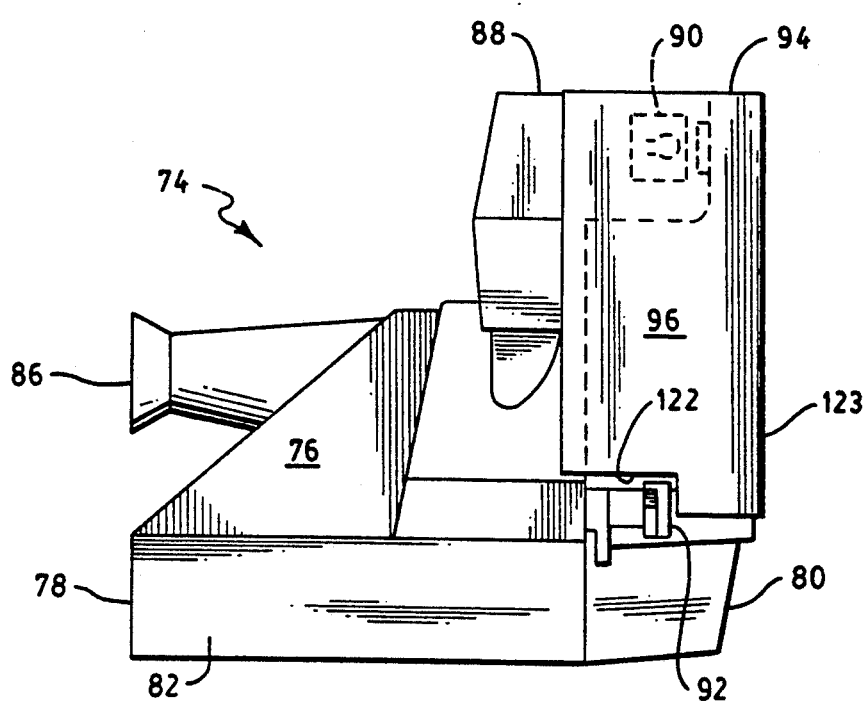
FIG. 2 is a side elevational view of a camera according to this invention having a light reflecting shield mounted on its front.

In operation the shield 94 of FIG. 5 is provided in flat form with the double-sided adhesive tape 100 on each side flap 96, 98. First the geometric patterns defined by score lines 126, 128, 130 are punched from the shield to provide apertures 106, 108, 110 for the flash unit, view finder, and lens opening, respectively. After side flaps 96, 98 are bent along score lines 124 to form the generally U-shaped structure of the shield with the white surface 116 on the inside of the U-shape, peel strips are stripped from the pressure sensitive adhesive 100 and the shield is attached to the front face of the camera 74 as illustrated in FIGS. 2-4.

Before the film cassette 14 is inserted into the camera 74, the template 12 is inserted into place between the dark slide and the forward wall 16 of the cassette with the stop 62 engaging the forward, laterally extending rib 36.

After the film cassette 14 is inserted into the camera 74 in conventional fashion and the dark slide ejected, the camera is ready to take photographs. Shutter 114 is actuated substantially simultaneously with the flash unit 90. Light from the flash unit impinges on the object 112 to be photographed and is reflected back through aperture 110 and lens opening 111 (FIG. 4). Simultaneously, light is reflected around the surfaces 116 of the U-shaped shield and the front face of the camera until some of the diffused light passes through lens opening 111 to function with the light from object 112 to expose film unit 44 in conventional fashion. The indicia on the template 12 is formed on each exposed film unit 44 by the diffused light.

While certain preferred embodiments of the present invention have been disclosed in detail, it is to be understood that various modifications may be adopted without department from the spirit of the invention or scope of the following claims.

What is claimed:

1. In combination, a camera having a housing for enclosing a film cassette containing a film unit, an opening in said housing to admit light to expose said film unit, a flash unit to illuminate an object to be photographed, a template containing indicia mounted in said housing intermediate said opening and said film unit, and an opaque light reflecting shield;
said opaque shield being attached to said housing and including a light reflecting surface spaced from said flash unit and from said opening in a direction toward said object to be photographed,
said light reflecting surface including at least first and second apertures, said first aperture being aligned with said opening and said second aperture being aligned with said flash unit; said first and second apertures, opening and flash unit being so located that a straight line from said flash unit through said second aperture to said object to be photographed allows a straight line of reflected light from said object to pass through said first aperture and said opening,
said light reflecting surface being configured to (A) reflect a portion of the light from said flash unit toward said housing and (B) a fraction of said reflected portion eventually passing through said opening into said housing and through said template to impinge on said film unit.

2. The combination of claim 1 wherein said opaque shield is attached to each side of said housing and said opaque shield defines a generally U-shape in extending from one side of the housing to the other.

3. The combination of claim 2 wherein said second aperture is of smaller cross-sectional area than said flash unit.

4. The combination of claim 3 wherein said opaque shield is attached to said housing by pressure sensitive adhesive.

5. The combination of claim 1 wherein said second aperture is of smaller cross-sectional area than said flash unit.

6. The combination of claim 5 wherein said opaque shield is attached to said housing by pressure sensitive adhesive.

7. The combination of claim 1 wherein said opaque shield is attached to said housing by pressure sensitive adhesive.

8. A process for taking photographs comprising providing a camera, a film cassette containing at least one film unit, a template, and an opaque shield,
providing indicia on said template,
said film cassette including means forming an exposure window, mounting said template in alignment with said window whereby light entering said film cassette through said window passes through said template before striking said film unit,
inserting said film cassette into said camera,
said camera including a lens opening and a flash unit,
forming first and second apertures in said opaque shield,
attaching said opaque shield to said camera with said second aperture spaced from and aligned with said flash unit,
aligning said first aperture with said lens opening,
forming a light reflecting surface on said opaque shield and attaching said opaque shield to said camera with said light reflecting surface facing toward said camera,
actuating said flash unit and opening the lens opening to allow light from said flash unit (1) to travel in a straight line from said flash unit through said second aperture to an object to be photographed and back in a straight line from said object through both said first aperture aligned with said lens opening and said lens opening into said camera and (2) to impinge on said light reflecting surface of said opaque shield and be reflected at least once before passing through said lens opening into said camera,
directing light from said lens opening through said template and onto said film unit.

9. A process for taking photographs comprising providing a camera, a film cassette containing at least one film unit, a template, and an opaque shield,
providing indicia on said template,
said film cassette including means forming an exposure window, mounting said template in alignment with said window whereby light entering said film cassette through said window passes through said template before striking said film unit,
inserting said film cassette into said camera,
said camera including a lens opening and a flash unit,
forming first and second apertures in said opaque shield,
attaching said opaque shield to said camera with said second aperture spaced from and aligned with said flash unit,
aligning said first aperture with said lens opening,
forming a light reflecting surface on said opaque shield and attaching said opaque shield to said camera with said light reflecting surface facing toward said camera,
actuating said flash unit and opening the lens opening to allow light from said flash unit (1) to travel in a straight line from said flash unit through said aperture to an object to be photographed and back in a straight line from said object through both said first aperture aligned with said lens opening and said lens opening into said camera and (2) to impinge on said light reflecting surface of said opaque shield and be reflected at least once before passing through said lens opening into said camera,
directing light from said lens opening through said template and onto said film unit,
taking said opaque shield as a flat piece and forming score lines in said piece, and
folding said piece along said score lines to form said opaque shield into a U-shape with the light reflecting surface comprising the inner portion of the U.

10. The process of claim 9 comprising applying pressure sensitive adhesive to each leg of the U-shaped piece and fitting said U-shaped piece over the lens side of the camera,
applying pressure at said adhesive against the sides of said camera to attach said opaque shield to said camera.

11. The process of claim 10 wherein the step of forming said first and second apertures in said opaque shield comprises forming score lines in said shield of desirable shapes and sizes, punching said scored shapes from said opaque shield to provide said first and second apertures.

12. Photographic apparatus comprising, in combination:
a camera having a housing for receiving a film cassette containing at least one film unit, a lens and shutter assembly, and a strobe for illuminating an object to be photographed;
a film assemblage including a film cassette having an exposure aperture therein, and at least one film unit;
a template having indicia on peripheral portions thereof which is adapted to be reproduced on said film unit during an exposure cycle, said template being adapted to be located in alignment with and between said film unit and said exposure aperture in said film cassette; and a card having first and second major opposite sides, said first side having an opaque reflective surface and means for defining at least first and second openings in said opaque card and means for releasably attaching said card to said camera such that said reflective surface is facing said lens and shutter assembly and said strobe with said first opening being located in alignment with said lens and shutter assembly and said second opening being located in alignment with said strobe, whereby during an exposure cycle 1) a portion of the light emitted by said strobe passes through said second opening and is reflected by the object being photographed back toward said camera as image bearing light where it passes through said first opening, said lens and shutter assembly, and said template before striking said film unit and exposing a generally central portion thereof and 2) another portion of the emitted strobe light directly strikes said reflective surface of said opaque card and is reflected by the facing surfaces of said camera and said reflective surface until some of the rays of the reflected light pass through the lens and shutter assembly as diffused non-image bearing light and are directed through said template so as to reproduce said indicia on peripheral portions of said film unit.

13. Photographic apparatus as defined in claim 12 wherein said film unit is of the self developing type.

14. Photographic apparatus as defined in claim 12 wherein said opaque card is a greeting card having indicia on said second major side whose theme is substantially compatible with said indicia on said template.

15. Photographic apparatus as defined in claim 14 wherein said greeting card, said template, and said film assemblage are adapted to be packaged as a commercial unit for sale separate from or in combination with said camera.

16. Photographic apparatus as defined in claim 15 wherein said film unit is of the self-developing type.

17. A process for taking photographs comprising providing a camera, a film cassette containing at least one film unit, a template, and a light reflecting shield,
providing indicia on said template,
said film cassette including means forming an exposure window, mounting said template in alignment with said window whereby light entering said film cassette through said window passes through said template before striking said film unit,
inserting said film cassette into said camera,
said camera including a lens opening and a flash unit,
forming first and second apertures in said shield by forming score lines in said shield of desirable shapes and sizes, and punching said scored shapes from said shield to provide said first and second apertures,
attaching said shield to said camera with said second aperture spaced from and aligned with said flash unit,
aligning said first aperture with said lens opening,
forming a light reflecting surface on said shield and attaching said shield to said camera with said light reflecting surface toward said camera,
actuating said flash unit and opening the lens opening to allow light from said flash unit (1) to travel in a straight line from said flash unit through said second aperture to an object to be photographed and back in a straight line from said object through both said first aperture aligned with said lens opening and said lens opening into said camera and (2) to impinge on said light reflecting surface of said shield and be reflected at least once before passing through said lens opening into said camera, and
directing light from said lens opening through said template and onto said film unit.

* * * * *